Sept. 8, 1931.  J. HEKTNER  1,822,347
FLEXIBLE JOURNAL BOX MOUNTING
Filed July 27, 1929  3 Sheets-Sheet 1
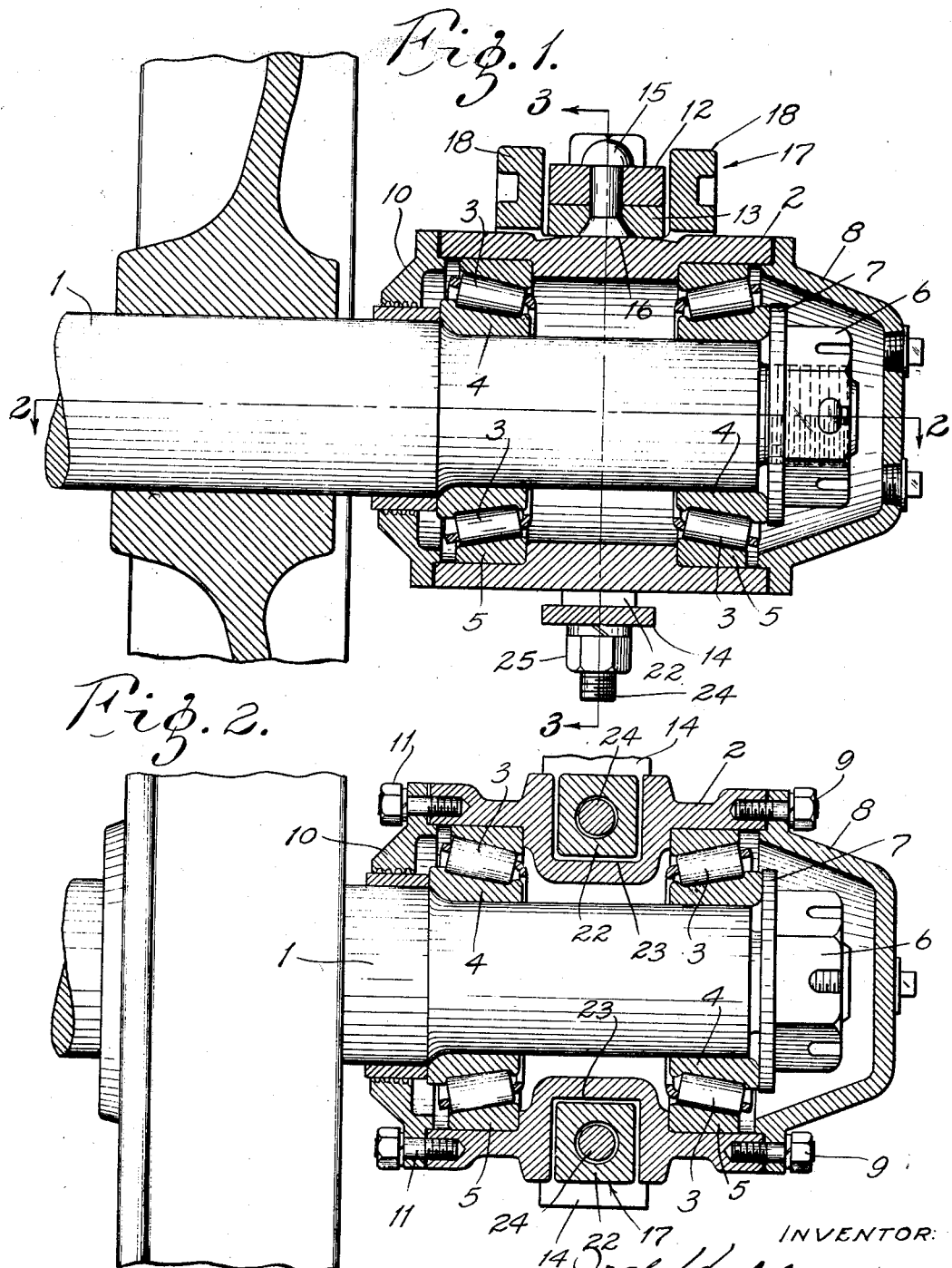

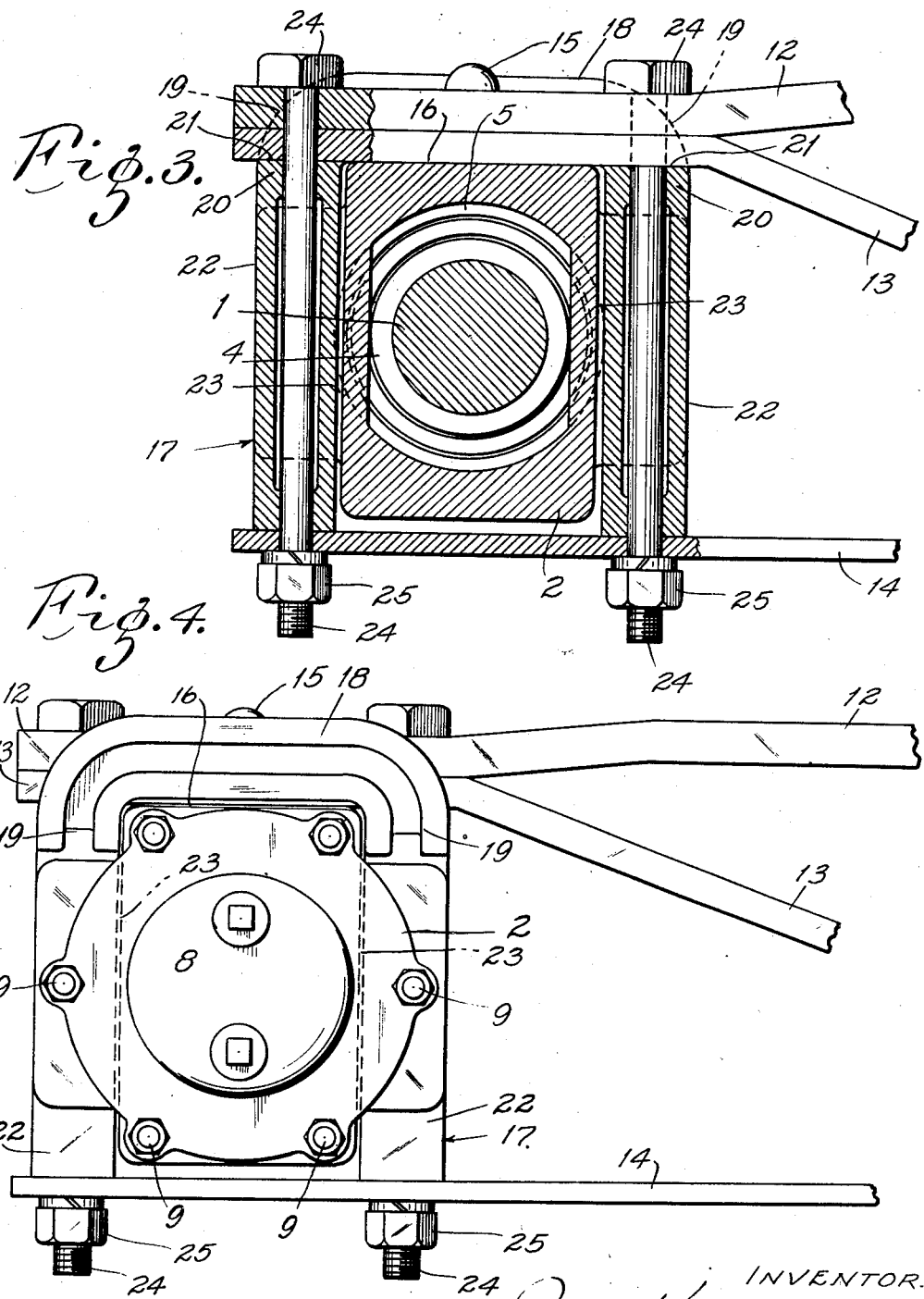

Sept. 8, 1931. J. HEKTNER 1,822,347
FLEXIBLE JOURNAL BOX MOUNTING
Filed July 27, 1929 3 Sheets-Sheet 3

INVENTOR:
Joel Hektner
HIS ATTORNEYS.

Patented Sept. 8, 1931

1,822,347

UNITED STATES PATENT OFFICE

JOEL HEKTNER, OF CANTON, OHIO, ASSIGNOR TO THE TIMKEN ROLLER BEARING COMPANY, OF CANTON, OHIO, A CORPORATION OF OHIO

FLEXIBLE JOURNAL BOX MOUNTING

Application filed July 27, 1929. Serial No. 381,462.

My invention relates to the mounting of journal boxes of railway cars and the like, particularly those in which antifriction bearings are used; and it has for its principal object a construction that is simple and inexpensive, that can be used in connection with truck side frames of the well known arch bar type and that permits limited movement of the journal box relative to the truck side frame, so that the journal box can adapt itself to the axle and is not affected by distortion of the truck side frame, thus insuring the proper running of the antifriction bearings in the journal box.

The invention consists in the flexible journal box mounting and in the parts and combinations and arrangements of parts hereinafter described and claimed.

Figure 5:
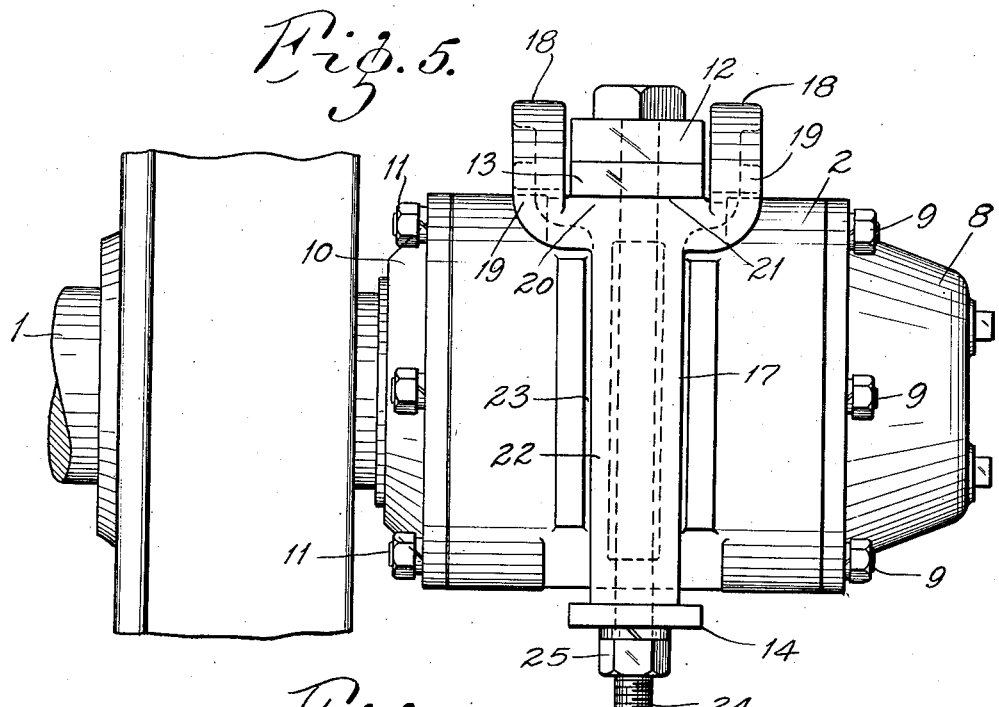
Figure 6:
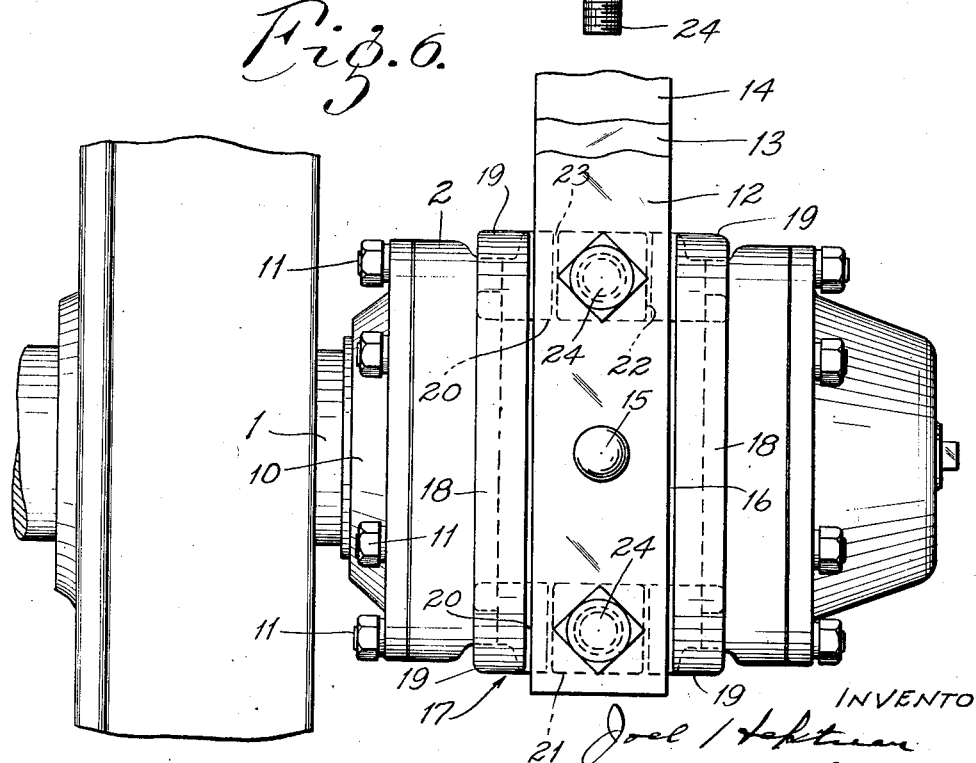

In the accompanying drawings,

Fig. 1 is a vertical longitudinal sectional view of a flexible box mounting for railway car axles embodying my invention, Fig. 2 is a horizontal sectional view on line 2—2 of Fig. 1, Fig. 3 is a vertical cross sectional view on line 3—3 of Fig. 1, Fig. 4 is an elevation looking toward the end of the journal box, Fig. 5 is an elevation, looking at the side of the journal box; and Fig. 6 is a top plan view.

The drawings show one end portion only of one axle 1 of a railway car truck and its associated journal box 2, it being understood that each end of said axles conforms in construction to the showing of the drawings.

Interposed between the axle and the journal box is an antifriction bearing, the drawings illustrating two spaced series of tapered rollers 3, each series provided with a cone or inner bearing member 4 mounted on the axle and a cup or outer bearing member 5 mounted in the journal box. A lock nut 6 and washer 7 are mounted on the outer end of the axle to hold the bearing parts on the axle. A suitable cap 8 is provided for the outer end of the journal box, being secured by screws 9 and a closure ring 10 is provided for the inner end of the journal box, being secured by screws 11.

The truck side frame shown in the drawings is of the arch bar type, including a top arch bar 12, a bottom arch bar 13 and a tie bar 14. The two arch bars come together at their ends and are secured together, as by rivets 15, thus constituting a single member to be supported on top of the journal box. The top of the journal box is provided with a convexly curved seat 16 to receive the arch bar 13 that rests thereon.

Interposed between the arch bar 13 and the end of the tie bar 14 that is spaced therefrom extending beneath the journal box 2 is a pedestal 17 that has spaced upper portions 18 extending across the top of the journal box along either side of the joined ends of the arch bars 12 and 13 and spaced therefrom. On either side of the journal box, said upper portions 18 have downwardly extending end portions 19 that merge into a connecting web portion 20 that has a flat seat 21 engaging the under side of the bottom arch bar 13.

From each connecting web portion 20 extends an elongated arm 22 whose lower end engages the top of the tie bar 14. Said arm extends through an enlarged depression 23 in the side of the journal box, the spacing apart of the two roller bearings making room for such depression. The walls of said depression constitute guides for said arms and permit relative movement of said arms 22 and journal box 2. Extending axially through each arm 22 and through said connecting web portion 20 and the arch bars 12 and 13 thereabove is a securing bolt 24 that has a nut 25 threaded onto its lower end, which projects beneath the tie bar.

The arch bars, tie bar and pedestal are securely held together by the bolts and by the construction above described. The journal box is permitted limited rocking movement in the truck side frame, this movement being accommodated by reason of the convex seat, the enlarged recesses through which the pedestal arms extend and the freedom from bolts, nuts or other securing devices directly connecting the arch bars and the journal box. At the same time, the journal box and side frame are firmly held together.

Obviously, numerous changes might be made without departing from the invention and I do not wish to be limited to the precise construction shown.

What I claim is:

1. In combination, a journal box, an axle extending thereinto, two spaced roller bearings interposed between said axle and said journal box, said journal box having a vertically extending depression in each side wall between said bearings, a truck side frame having an upper member resting on the top of said journal box, said top being convexly curved, said truck side frame also having a lower member extending beneath said journal box, and a pedestal secured to said upper and lower side frame members, said pedestal having portions extending over the top of said journal box alongside of said side frame member but spaced therefrom, said top portions merging at each side of the journal box into a connecting web engaging the underside of said truck side frame member and depending arms extending from said connecting webs to said lower side frame member, said arms being disposed in said depressions in the sides of said journal box and being smaller than said depressions to permit movement of said journal box relative to said side frame.

2. In combination, a journal box, an axle extending thereinto, two spaced roller bearings interposed between said axle and said journal box, said journal box having a vertically extending depression in each side wall between said bearings, a truck side frame having an upper member resting on the top of said journal box, said top being convexly curved, said truck side frame also having a lower member extending beneath said journal box, a pedestal connecting said upper and lower side frame members, said pedestal having portions extending over the top of said journal box alongside of said side frame member but spaced therefrom, said top portions merging at each side of the journal box into a connecting web having a flat seat portion engaging the underside of said truck side frame member and depending arms extending from said connecting webs to said lower side frame member, said arms being disposed in said depressions in the sides of said journal box and being smaller than said depressions to permit movement of said journal box relative to said side frame, and bolts extending through said lower side frame member, pedestal arms, pedestal connecting web portions and upper side frame member.

3. In a device of the character described, an axle box, an axle journalled in the box, a truck frame bar engaging the top of the box and movably mounted thereon to allow the box and frame member to have a relative tilting movement longitudinally of the axle, a pedestal structure having side walls embracing the frame bar and depending legs embracing the sides of the box, and cross webs connecting the side walls; substantially as described.

4. In a device of the character described, an axle box, an axle journalled in the box, a truck frame bar extending across and resting on the top of the box, and a pedestal structure having side walls embracing the frame bar with cross webs connecting the side walls at opposite sides of the box; substantially as described.

Signed at Canton, Ohio, this 24th day of July, 1929.

JOEL HEKTNER.